A. A. RHEUTAN.
Envelope-Machine.

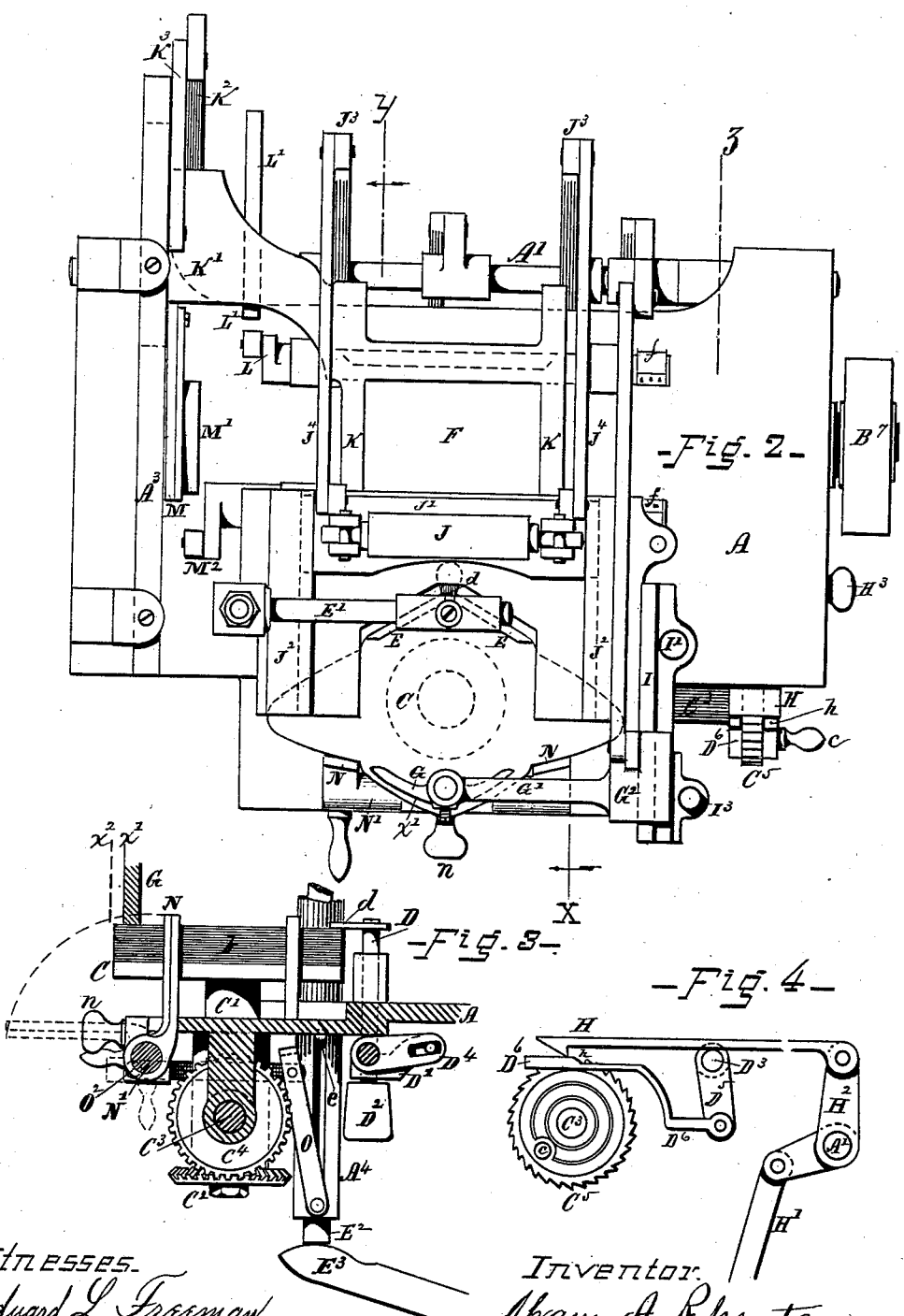

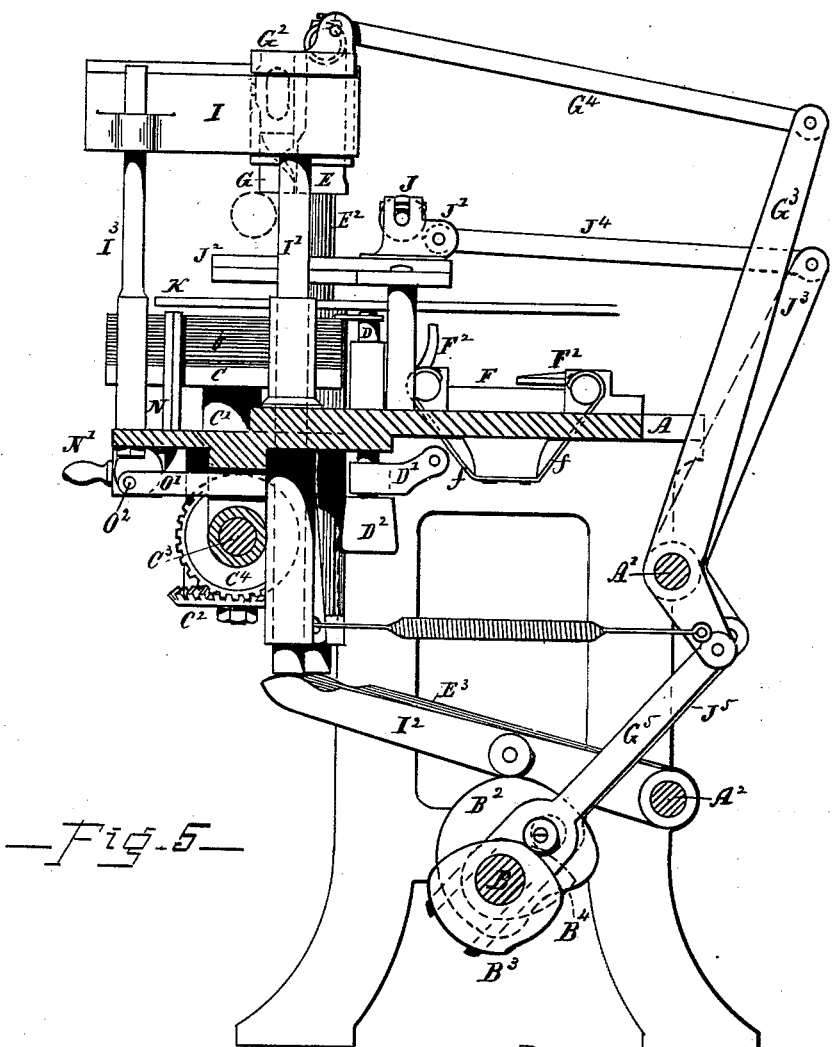

No. 225,947. Patented Mar. 30, 1880.

Witnesses
Edward L. Freeman
Geo. M. Rice 2d

Inventor
Abram A. Rheutan
By Chas. H. Burleigh
Atty.

5 Sheets—Sheet 5.
A. A. RHEUTAN.
Envelope-Machine.
No. 225,947 Patented Mar. 30, 1880.
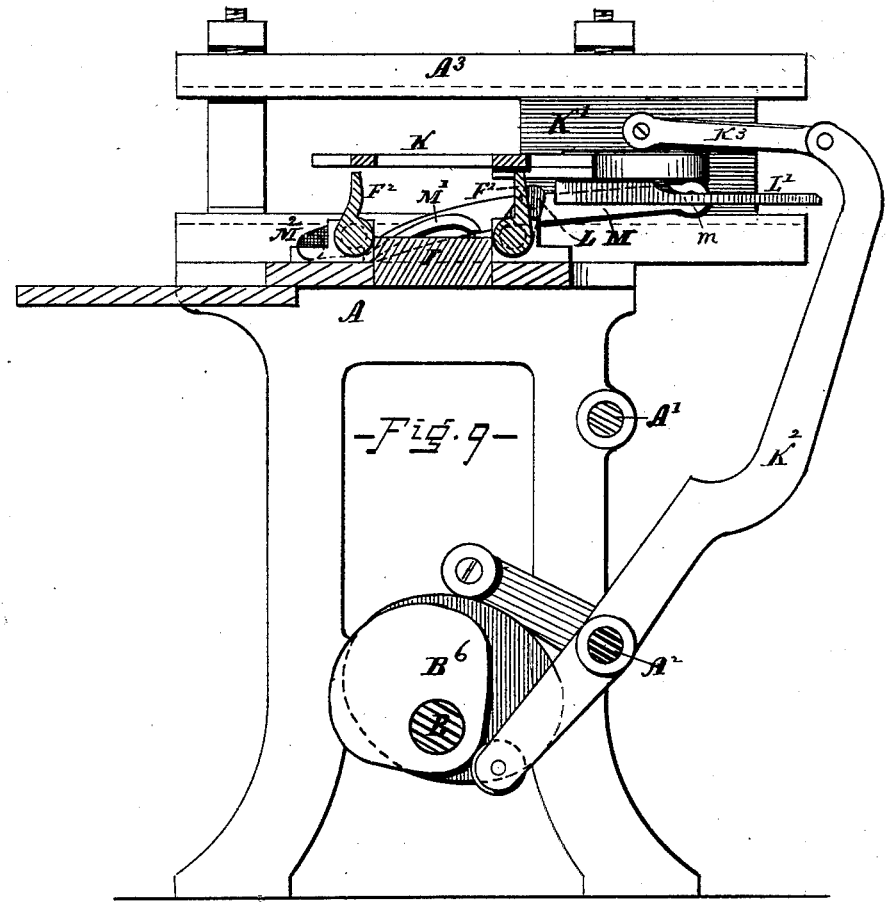
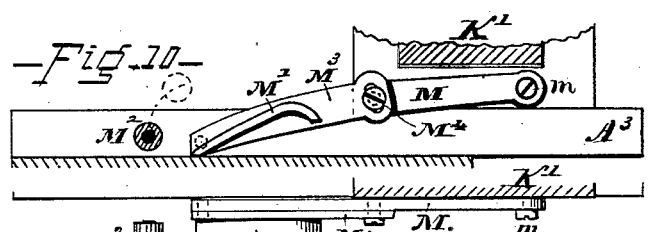

UNITED STATES PATENT OFFICE.

ABRAM A. RHEUTAN, OF WORCESTER, MASSACHUSETTS, ASSIGNOR TO WADE H. HILL, OF SAME PLACE.

ENVELOPE-MACHINE.

SPECIFICATION forming part of Letters Patent No. 225,947, dated March 30, 1880.

Application filed August 27, 1879.

*To all whom it may concern:*

Be it known that I, ABRAM A. RHEUTAN, of Worcester, in the county of Worcester and State of Massachusetts, have invented certain new and useful Improvements in Envelope-Machines; and I declare the following to be a description of my said invention sufficiently full, clear, and exact to enable others skilled in the art to which it appertains to make and use the same, reference being had to the accompanying drawings, which form a part of this specification, and in which—

Figure 1:
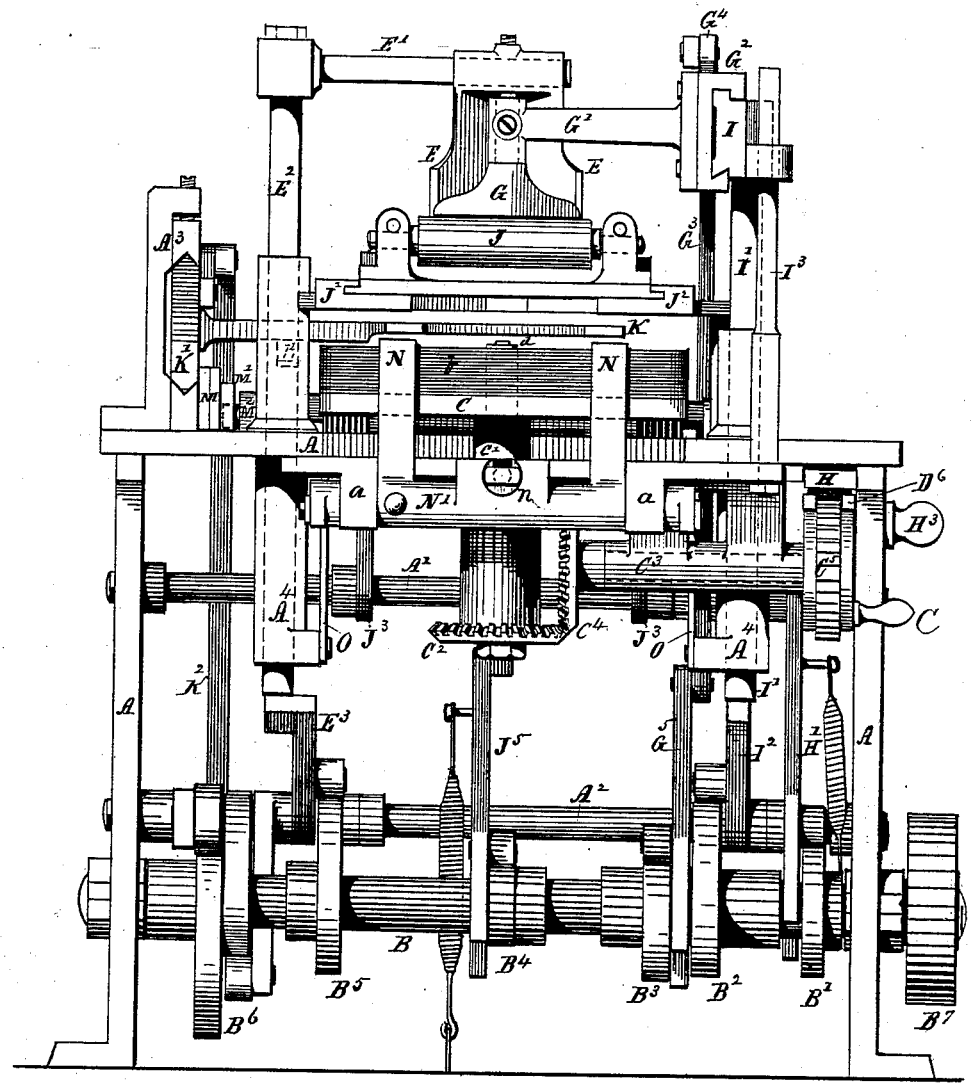
Figure 8:
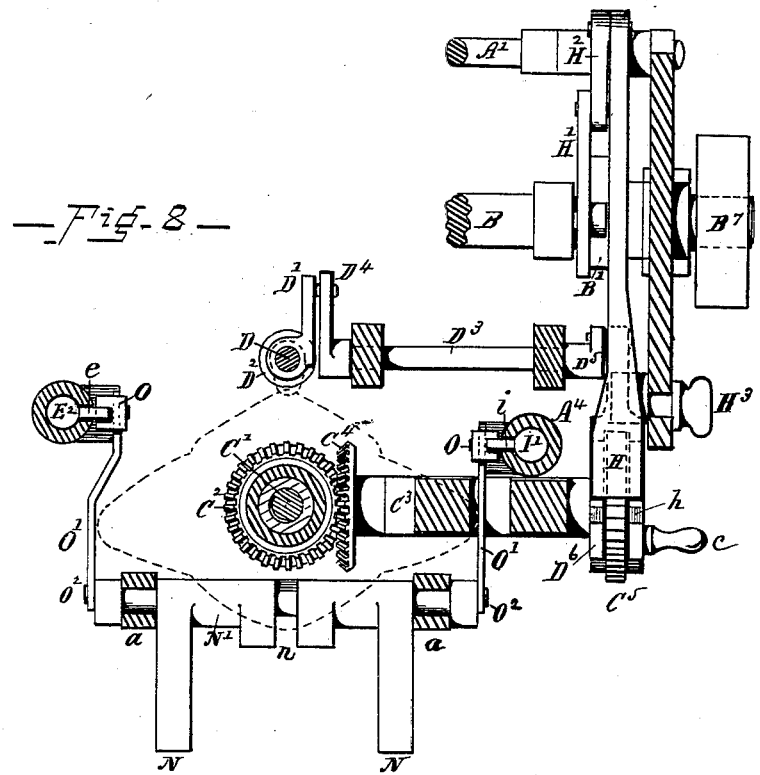
Figure 7:
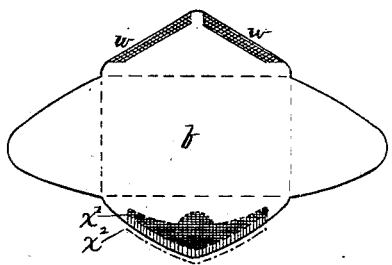

Figure 1 represents a front view of such parts of an envelope-machine as are necessary to illustrate the nature of my invention. Fig. 2 represents a plan view of the same. Fig. 3 is a sectional view at line $x$, showing the feed-table and devices connected therewith. Fig. 4 is a side view of the ratchet mechanism for elevating the feed-table. Fig. 5 is a sectional view at line $z$, showing the mechanism for applying the gum or paste to the envelope-blanks. Fig. 6 is a diagram illustrating the movement of the gumming-heads. Fig. 7 is a plan view of an envelope-blank, showing the manner in which the gum is applied thereto. Fig. 8 is a horizontal sectional view, showing a plan of mechanism employed in connection with the feed-table and its elevating devices. Fig. 9 is a vertical sectional view at line $y$, showing the conveyer-slide and devices for operating the folders. Fig. 10 is a side view of the arm for operating the sealing-tab folder; and Fig. 11 is a plan view of the same, with the end of the folder.

This invention relates to certain improvements in that class of machines employed for folding envelope-blanks which have been previously cut to the proper shape, and wherein the said blanks are placed in quantities upon a suitable support or feed-table, to be automatically taken therefrom by the mechanism, one by one, gummed, folded, and delivered in completed condition to the drying, counting, or bunching apparatus.

It will be understood that portions of the machine not herein shown or particularly described may be constructed to operate in the ordinary manner or in any suitable way for properly effecting the result desired.

One feature of my invention consists in the employment, in combination with the feed-table, elevating mechanism, and separator device, of a ratchet-wheel, operating-pawl, ratchet-guard, and ratchet-guard-actuating devices, as hereinafter described, thereby adapting the separator device for the automatic regulation of the mechanism, whereby the feed-table or blank-supporting devices are elevated to present the top of the pile of blanks at proper height to receive the gumming-heads, as more fully hereinafter explained.

Another feature of my invention consists in arranging the gum-applying devices in an envelope-machine in such manner that one of the gummers has a sliding or wiping action off or toward the edge of the blank, while the other by its pressure retains the blank in position, as more fully hereinafter explained.

Another feature of my invention consists in arranging the gumming-head in an envelope-machine to have a vertical and horizontal action, whereby said gumming-head is brought to a position near the pick-up fingers when elevated for receiving their charge of gum or paste by a short action of the gum-box roll, as more fully hereinafter explained.

Another feature of my invention consists in the combination and arrangement of the mechanism for operating the gumming-head and gum-supplying devices, as hereinafter described.

Another feature consists in the combination, with the feed-table, of a swinging guard-finger device, constructed and operating in the peculiar manner described, for permitting convenient access to the feed-table when renewing the supply of blanks, as hereinafter more fully explained.

Another feature of my invention consists in the combination, with the swinging devices of the guard-fingers for supporting the blanks in position on the feed-table, of mechanism for retaining the gumming-head and pick-up fingers in elevated position during the time said guard is open or away from its position against the pile of blanks, as more fully hereinafter described.

Another feature of my invention consists in the combination, with the conveyer-slide, of devices for operating the folding-flaps, as hereinafter set forth.

Other minor features of invention will be understood from the following detailed description of the parts, the particular subject-matter claimed being hereinafter definitely specified.

In the drawings, A denotes the frame, which may consist of a suitable table or bed-plate with side standards, the form and size of said frame being adapted to properly support the operating mechanism.

B indicates the main driving or cam shaft, upon which are located the several cams $B'$ $B^2$ $B^3$ $B^4$ $B^5$ $B^6$, for imparting movement, as required, to the various portions of the machine, said cams being severally formed to move their respective parts at such times and with such peculiar action as is essential to the perfect operation of the machine in the accomplishment of its work, while the shaft B is regularly revolved by the driving-belt running on the pulley $B^7$.

$A'$ and $A^2$ indicate rods or shafts for supporting the fulcrums of the several cam-bars or levers, in the manner shown.

C denotes the feed-table for supporting the envelope-blanks $b$, and from which said blanks are carried by the conveyer, one at a time, to the folding-bed F. Said feed-table C is supported on a telescoping standard, $C'$, provided with a suitable screw mechanism worked by the wheel or bevel-gear $C^2$, whereby said feed-table can be raised or depressed, as required, to support the pile of blanks, whether few or many, with the upper blank at the same height or in proper position to be received by the gumming-head G and elevator or pick-up fingers E.

A horizontal shaft, $C^3$, with a bevel-gear, $C^4$, and ratchet-wheel $C^5$, is arranged for operating the elevating mechanism of the feed-table C, and said shaft $C^3$ can be turned by the hand-crank $c$, or automatically by the pawl device H engaging with the ratchet $C^5$.

D indicates the separator-bar, for preventing more than a single blank from being raised by the elevating-fingers E at each operation. The end $d$ of the separator D rests upon the top edge of the blanks, while its spindle passes downward through the table A and carries an arm, $D'$, and weight $D^2$.

A shaft, $D^3$, (see Figs. 3, 4, and 8,) with cranks $D^4$ and $D^5$ at its ends, is supported in suitable bearings on the under side of the table A, with its crank $D^4$ connected with the arm $D'$ of the separator-bar D, while its crank $D^5$ connects with and operates the ratchet-guard $D^6$, which latter rests upon the flanges of the ratchet-wheel $C^5$, at either side of the teeth, and, by means of inclined surfaces $h$, regulates the action of the pawl H in the manner indicated.

When the feed-table C is at such height as to present the blanks $b$ at proper level for the pick-up fingers E the separator D is elevated, so that the ratchet-guard $D^6$, connected therewith, occupies a position where its inclines $h$ prevent the pawl H from engaging the teeth of the wheel $C^5$. Then as the height of the pile of blanks is reduced the separator-bar D descends, causing the guard $D^6$ to take a forward position, allowing the pawl H to work the wheel $C^5$, which, in turn, operates the elevating devices of the feed-table C and raises said table sufficiently to bring the surface of the blanks to the proper level, the pile of blanks thus being moved up as fast as they are taken from the top of the pile to the folders.

The pawl H moves with a backward-and-forward reciprocating motion imparted thereto from the cam $B'$ through the bar $H'$ and lever $H^2$. A suitable cam or shipper device, $H^3$, is provided for raising the pawl H from action with the wheel $C^5$ when desired.

The elevating-head or pick-up fingers E, for applying gum to the lower tabs of the blanks, and by means of which the blanks are raised to the conveyer, is supported on the arm $E'$, and operated up and down in the usual manner by the vertically-reciprocating rod $E^2$, actuated by the cam $B^5$ and lever $E^3$.

The gumming-head G, for applying the seal to the upper tabs of the blanks, is supported on an arm, $G'$, carried by a horizontally-reciprocating slide, $G^2$, that is mounted on a suitable guideway, I, fixed to the upper part of a rod, $I'$, which latter is arranged to have a vertically-reciprocating movement, in the present instance, by the action of the lever $I^2$, in connection with the cam $B^2$, while the slide $G^2$ is adapted to be moved along the guideway I by means of the cam $B^3$, lever $G^3$, and connections $G^4$ $G^5$, as indicated. The guideway I is, in the present instance, prevented from swinging out of place by means of a suitable standard, $I^3$, on which it slides, as shown.

The guide-pin $I^3$ may be dispensed with by making the bar $I'$ square, triangular, or other irregular shape instead of cylindrical, or by using a spline in connection therewith to prevent it from turning in its bearing; or the pin $i$ may be made to serve as a spline. If preferred, a cross-head working in guides can be employed on the rod $I'$ for supporting the guideway I.

The parts are so arranged and adjusted that the gumming-head G, while receiving its charge of gum from the gumming-roll J, occupies a position in close proximity to the pick-up fingers E in their elevated position, as shown in Figs. 1, 5, and 6, the lower faces of the head G and fingers E being held level with each other, while the gumming-roll J travels forward with a short movement (see position indicated by dotted lines, Fig. 5) and back to place, rolling across their faces and transferring thereto a sufficient quantity of gum for fastening and sealing a blank. The head G then moves forward and downward, striking upon the blank at a short distance from its edge, as indicated at $x'$, Figs.

2, 3, 6, and 7, while the pick-up fingers E fall in a vertical line, striking their gummed ends onto the edge of the lower tab of the blank, as indicated at $w$. The head G and fingers E move in a manner similar to that indicated by dotted lines, Fig. 6, the head G reaching the blank slightly in advance of the fingers E; then, while the blank is held in position by the pick-up fingers E, the gummed ends of which rest upon its rear edge at $w$, the head G is moved horizontally forward, or with a sliding or wiping action, carrying its face partially off from the edge of the blank, or as indicated at $x^2$, Figs. 3, 6, and 7, thus wiping the gum from the face of the head to the surface of the blank. The head G is then raised and carried back to the position first indicated, while the blank is raised from the feed-table to a position where it will be taken by the conveyer K and transferred to a position over the folding-bed F, where it is pressed through the opening of the conveyer K and down onto the folding-bed by means of the rectangular creasing-plunger, (not herein shown,) said plunger and its operating mechanism being constructed and arranged in the ordinary manner.

By this mode of applying the gum, with a sliding or wiping motion of the gumming-head while in contact with the blank, a sufficient and uniformly-laid seal is produced, the seal is extended completely to the edge of the blank, and the gum is left smooth and free from air-bubbles.

The head G may, if desired, be formed of rubber or other elastic material, so as to conform to any irregularities in the blanks, or it may be wholly of metal, or of metal with an elastic lining or face.

The gum-box devices for the roll J may be of the ordinary or of any suitable construction, and therefore are not herein shown. The slide J', on which said roll J is mounted, is moved back and forth in its guides $J^2$ by means of the cam $B^4$, levers $J^3$, connections $J^4$, and bar $J^5$, arranged as indicated.

By moving the head G to a position adjacent to the fingers E while applying the gum thereto, the roll J has a shorter distance to travel while performing its work; consequently it has less momentum than in the ordinary machines, where it moves the entire width of the blank to reach the head G during the brief time of its action; hence the machinery can be run at a higher speed without liability of throwing gum off the roll J or from the gum-box devices.

The rear and front folding-flaps, F' and $F^2$, which fold the upper and lower tabs of the blank, I arrange to be operated by the same cam, $B^6$, and mechanism which operates the conveyer K. Said conveyer K is fixed to a slide, K', working in the guides $A^3$, and moved back and forth by the lever $K^2$ and connection $K^3$, actuated by the double cam $B^6$.

The folder F' is provided with a crank, L, at its end, while a depressing-bar, L', is attached to the under side of the conveyer K, which bar L' engages with the crank L as the slide K' moves forward, and by depressing said crank closes down the folder F'.

The bar L' is made with a backward extension, so as to retain the folder F' pressed down upon the envelope during the time the slide K' is in forward position.

For operating the folder $F^2$, which folds in the sealing-tab, I employ a bar, M, provided with an inclined flange, M', as indicated. (See Figs. 2, 9, 10, and 11.) Said bar M is pivoted at $m$ to the slide K', with its forward end located in such position that the flange M' will pass under the crank $M^2$ of the folder $F^2$ as the slide K' moves forward, and by elevating said crank turn down the folding-flap $F^2$. When the flange M' has passed the crank $M^2$ the folder $F^2$ is immediately raised by its spring $f$, and the flange M' is so arranged that it will pass above the crank $M^2$ without operating the folder when the slide K' moves back.

The folder $F^2$ is made with a curved flap, and is operated by quick movement to avoid contact of the seal on the upper tab with other parts of the envelope before said seal becomes dry.

The bar M, in the present instance, has an adjustable portion, $M^3$, to which the flange M' is secured, (see Figs. 10 and 11,) and whereby the height of said flange can be varied to give more or less throw to the folder $F^2$ by loosening the set-screw $M^4$ and raising the rear end of the part $M^3$.

The cranks L and $M^2$ are preferably provided with friction-rolls, as shown.

The front guards or pins, N N, for retaining the blanks $b$ in place upon the feed-table C, are arranged to swing forward and downward to a horizontal position, as indicated in Figs. 3 and 8. Said guard-pins N are formed upon a rocker bar or shaft, N', supported in bearings $a$ at the front edge of the frame A, as shown, and is provided with a suitable locking device, $n$, for retaining the guards in position against the blanks.

Combined with the movable guards N, and operating therewith, are devices for retaining the gumming-head G and fingers E in elevated positions during such time as the guard-fingers N are down. These retaining devices consist of stop-bars O, pivoted to the lower part of the bearings $A^4$, which support the vertical reciprocating rods I' and $E^2$, that carry the gumming-head G and fingers E. Said stop-bars O are arranged to swing beneath studs or pins $e$ $i$, fixed respectively in the rods $E^2$ I', and working through grooves or slots in the sides of the bearings $A^4$, as indicated.

The stop-bars O are connected by rods O' with cranks or eccentric studs $O^2$ at the ends of the rocker N' in such manner that when the guards N are up the studs $e$ $i$ are free to move up and down their grooves; then when the guards N are swung down the ends of the bars O pass under said studs $e\ i$ and support the rods $E^2$ $I'$ and parts connected therewith without stopping the other portions of the machine, thus permitting the supply of blanks to be conveniently renewed upon the table C, said feed-table C being first lowered by turning back the ratchet-wheel $C^5$ by aid of the hand-crank $c$.

The stop-bars O may be so arranged that they can be operated for engaging or releasing the bars $E^2$ $I'$ only when the cams $B^2$ $B^5$ are in position to support said parts, so that the mechanism cannot be injured or the gumming devices accidentally dropped by raising or lowering the guards N at the wrong moment.

What I claim as of my invention, and desire to secure by Letters Patent, is—

1. In an envelope-machine, the combination, substantially as hereinbefore described, of the adjustable feed-table provided with elevating devices and ratchet-wheel, the weighted separator-finger, the operating-pawl, the ratchet-guard, and the cranked shaft connecting said ratchet-guard with the separator, said parts being constructed and organized for operation as set forth.

2. In an envelope-machine, the combination, with the feed-table or blank-supporting device, of the lower tab-gummers or pick-up fingers and the seal-gumming head, with mechanism for operating the same in the manner set forth, whereby the blanks are securely retained in position by means of said pick-up fingers while applying the sealing-gum, as hereinbefore specified.

3. In an envelope-machine, the combination, with the pick-up fingers and gumming-roller, of the seal-gumming head, with mechanism for imparting thereto a backward-and-forward action, substantially as described, whereby said head is carried to a position adjacent to said pick-up fingers, as and for the purpose set forth.

4. In an envelope-machine, the combination, substantially as described, of the gumming-head G, the horizontally-reciprocating slide $G^2$, for supporting said head, and the vertically-moving guideway I, for supporting said slide, as set forth.

5. In an envelope-machine, the combination, substantially as hereinbefore described, of the reciprocating slide $G^2$, carrying the head G, the vertically-moving guideway I, for supporting said slide, the actuating-cams $B^2$ $B^3$ on shaft B, the levers $I^2$ and $G^3$, the vertical rod $I'$, and the connecting-rods $G^4$ $G^5$, as and for the purposes set forth.

6. In an envelope-machine, in combination, substantially as hereinbefore described, the feed-table C, the pick-up fingers E, supported on rod $E'$, the gumming-roll J, the gumming-head G, supported on slide $G^2$, the guideway I, supported on rod $I'$ and guide $I^3$, the operating-levers $I^2$ $G^3$ $J^3$ $E^3$, the connections $G^4$ $G^5$ $J^4$ $J^5$, and the actuating-cams $B^2$ $B^3$ $B^4$ $B^5$ on shaft B, arranged and operating as set forth.

7. In an envelope-machine, the combination, with the conveyer-slide and folding-flaps, of folder-actuating devices attached to or connected with said conveyer-slide, whereby the folding mechanism is operated by the same cams and levers which move the conveyer-slide, substantially as hereinbefore set forth.

8. In an envelope-machine, the combination, substantially as described, of the folding-flap $F'$, provided with crank L, and the conveyer slide or arm $K'$, provided with a lug or depressing-bar, $L'$, for the purpose set forth.

9. In an envelope-machine, the combination, substantially as described, of the folding-flap $F^2$, provided with crank $M^2$, the conveyer-slide $K'$, and the actuating-bar M with flange or incline $M'$, for the purposes set forth.

10. In an envelope-machine, the combination, with the removable guard-finger devices for retaining blanks upon the feed-table, of the automatic stop devices actuated by said guard-finger device for retaining the gumming-head and pick-up fingers in elevated position while the guard-fingers are removed from the front of the feed-table, substantially as hereinbefore set forth.

11. In an envelope-machine, the combination, substantially as described, of the feed-table C, the guard-fingers N, the rocker-shaft $N'$, with eccentric studs $O^2$, the vertical rods $E^2$ $I'$, having pins or lugs $e\ i$, the stop-bars O, and connecting-rods $O'$, for the purposes set forth.

Witness my hand this 21st day of August, A. D. 1879.

ABRAM A. RHEUTAN.

Witnesses:
CHAS. H. BURLEIGH,
S. R. BARTON.